United States Patent Office 2,990,131
Patented June 27, 1961

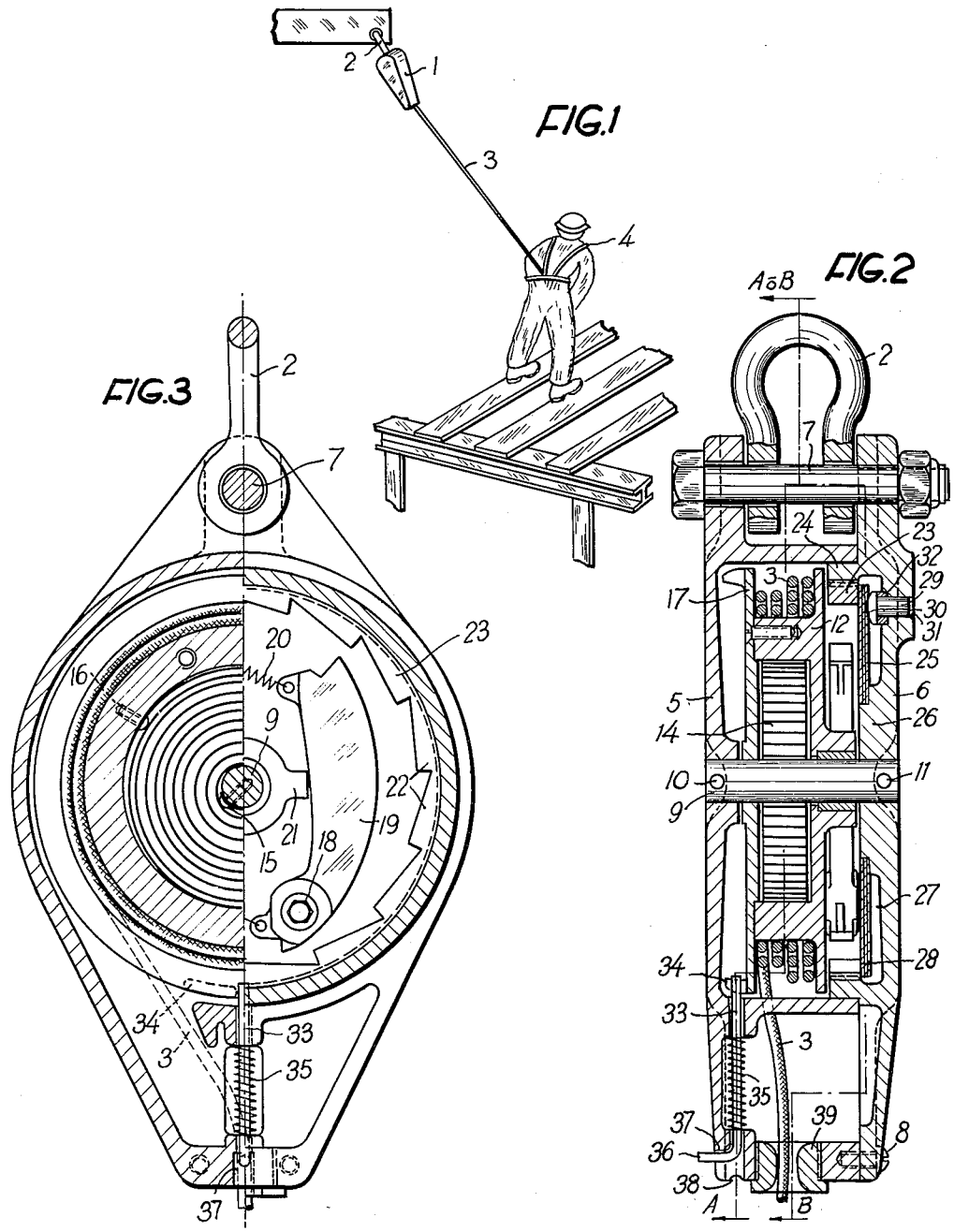

2,990,131
SAFETY BLOCK
Carl David Carlsson, Sala, Sweden, assignor to Sala Maskinfabriks Aktiebolag, Sala, Sweden, a corporation of Sweden
Filed Nov. 21, 1958, Ser. No. 775,470
Claims priority, application Sweden Jan. 22, 1958
5 Claims. (Cl. 242—107.4)

When working in mines and in other places where the worker is subjected to the risk of falling down from a considerable height, safety blocks are made use of which are suspended from some rigid support while being provided with a cable adapted to be pulled out from the block, which cable may be connected to a belt on the worker. In a known construction of such safety blocks, the sheave onto which the cable is wound in the block is actuated by a spring adapted to be stretched as the cable is pulled out. Should the worker happen to fall, so that a sudden jerk is produced in the cable, a centrifugal locking mechanism is brought into function, so that the sheave is locked and is prevented from being pulled out any more. The known construction has the disadvantage that the stoppage of the sheave takes place too suddenly and subjects the cable and the worker to unnecessary strains, when the worker's movement of fall is suddenly interrupted.

In a known safety block, this drawback has been prevented by a friction brake which, as a result of a sudden jerk in the cable, is coupled to the sheave. This brake comprises brake shoes cooperating with a drum and actuated by a complicated cam mechanism. A safety device should be of a simple and solid construction and should include a minimum of elements, since otherwise the safety could easily get lost.

The main object of the invention is to obtain a safety block of simple and compact design which operates accurately with a maximum of safety. The safety block includes a spring-actuated winding sheave and a centrifugal clutch adapted to couple the sheave to a friction brake when a predetermined rotational speed is exceeded. The substantial characteristic feature of the invention resides in the fact that one of the cooperating brake members of the brake is formed as a spring arranged so as to have its spring force successively augmented as the braking operation proceeds. Since the brake member proper is formed as a spring, no separate restoring springs are necessary.

In a preferred embodiment of the invention, the spring brake member comprises one or more elastic washers in frictional engagement with a frictional surface of a ratchet rim having a screw-threaded engagement with the housing of the block, the successively increasing braking action taking place as a result of rotation of the ratchet rim on engagement of the centrifugal clutch and screwing of said rim against the washer for deflection thereof.

The serviceableness of the safety block is augmented, if it is provided with a catch, by means of which the sheave may be locked in the block casing. By this means it will be possible to use the cable of the safety block also as a supporting cable, for instance, when working on roofs.

An example of applying the invention is illustrated in the drawing, wherein FIG. 1 shows the use of the safety block in a perspective view and FIG. 2 is an axial section of a safety block according to the invention on a larger scale. FIG. 3 shows two radial sections, one of them, shown on the left in FIG. 3, being taken on the broken line A—A in FIG. 2, and the other, shown on the right in FIG. 3, being taken on the line B—B in FIG. 2.

As shown in the drawing, the block mechanism is enclosed in a housing 1 having an attaching eye 2 and a cable 3 adapted to be pulled out from the housing and intended to be connected to a belt 4 on the worker (FIG. 1). The block housing consists of a box 5 and of a suitable cover 6 which is retained on the box, in part by means of a bolt 7 for the attaching eye 2 and in part by means of screws 8. Centrally arranged there is a non-rotatable pin 9 extending both through the box and through the cover while being locked by means of two transversely extending pins 10, 11. Rotatably mounted on the pin 9 is a sheave 12 formed as a casing for a spiral spring 14, the inner end of which is secured by means of a screw 15 to the pin 9 and the outer end of which is likewise secured in the sheave 12 by means of a screw 16. The sheave is provided with a flanged end plate 17 forming a cover for the spring housing, and is removably secured to said housing. The spiral spring 14 is so arranged as to tend to wind the cable 3 onto the sheave. When the cable is pulled out, the spring will thus be stretched.

Arranged on the outer wall of the sheave 12 is a bolt 18 on which is mounted a pawl 19 which is kept bearing, by a spring 20, against a shoulder 21 on the hub of the sheave. A centrifugal pawl of this description is preferably provided on both sides of the axis of rotation (pin 9) of the sheave in diametrically opposed positions. One end of the pawl is adapted to cooperate with internal ratchet teeth 22 on a ratchet rim 23, which is provided with screw threads at the outer peripheral portion thereof, said screw threads engaging corresponding screw threads in an annular flange 24 formed integral with the cover 6 at the inner wall thereof. The centrifugal clutch mechanism formed by the pawls 19 and the springs 20 is brought into function when the rotational speed of the sheave exceeds a predetermined value, the pawls being thus caused to swing out into engagement with the ratchet teeth 22 against the action of the springs 20.

The ratchet rim 23 forms the one braking member of a friction brake, the other braking member of which is constituted by a number of elastic washers 25 laid together, said washers being provided with central apertures while being secured at the inner circumference thereof to a central inwardly projecting portion 26 at the cover 6, in a manner such that they cannot turn relatively to said cover. The elastic washers are otherwise free from the cover and may spring with their outer portion in a direction toward the cover which, for the purpose in view, shows a free space 27. The elastic washer package formed by said washers bears inwardly at the side of the ratchet rim 23 which is formed here with a radial friction surface 28 to provide for a braking effect with the elastic washer package. The more the ratchet rim is screwed toward the cover through the threaded engagement with the flange 24 of the cover, the more will the elastic washers bulge out to become stretched. A braking effect will thus be produced between the turned ratchet rim 23 and the elastic washers 25 and also between the screw threads of the ratchet rim 23 and the corresponding screw threads in the flange 24 of the cover, said braking effect increasing successively due to the successively augmented stretching of the elastic washers, according as the turning of the ratchet rim proceeds.

The safety block may be provided with an indicator adapted to indicate whether the safety block is released, that is to say, whether the brake has been caused to operate. In the construction shown, said indicator consists of a pin 29 displaceable in the cover 6 of the block housing, one end of said pin, which is preferably formed into a head 30, being actuated by the elastic washers 25 of the brake, while the other end of the pin is visible through an aperture 31 in the cover. According to FIG. 2, the pin 29 extends substantially all through the cover, and it may have the outer end thereof flush with the outside of the cover, when the brake is unactuated in its position of preparedness. In this position the head 30 is kept bearing on the elastic washers 25 by means of a spring 32, for example, a rubber bushing mounted on the pin. If the brake is actuated at a release of the centrifugal clutch mechanism and the elastic washers are deflected, the pin will be pressed outwardly, so that the outer end thereof projects outside the cover 6. After such a release, the cover 6 is to be removed and the ratchet rim to be turned back into its initial position, whereupon the block, on having been assembled, is prepared to be used anew. This involves, at the same time, the advantage of causing an inspection and control of the entire safety mechanism in the housing.

Sometimes, it may be found desirable to use the cable of the safety block as a supporting cable. To render this possible the safety block is provided with a catch by means of which the sheave 12 may be locked, after the cable has been pulled out to a desired length. In the construction shown, said catch consists of a pin displaceably mounted in the block housing, the inner end of which pin may be brought into locking position in front of a shoulder 34 on the end plate 17 of the sheave in order thus to prevent continued turning of the sheave through the withdrawal of the cable. Provided on a shaft of the locking pin is a helical spring 35 tending to retain the locking pin in locking position, and which is compressed when the locking pin is withdrawn. Said shaft is provided with a bent outer end 36 and may be turned, so that said end may be moved from engagement in an inner abutting groove 37 in the locking position by withdrawal and turning into an outer groove 38 at right angles thereto into the position releasing the sheave.

Provided at the bottom of the block is a bushing 39 with rounded aperture edges to carry the cable coming from the sheave therethrough.

With respect to the mode of operation of the safety block, it need only be added that in movements, normally performed by the worker, the cable is pulled out of or is introduced into the safety block while the cable is uncoiled from or is coiled into the sheave, without the centrifugal mechanism being released. The spiral spring 14, which is comparatively long and is wound in a great number of convolutions, does not offer any appreciable resistance to the withdrawal of the cable, for which reason the safety block need not interfere with the worker. Should the worker happen to fall, so that a sudden jerk is produced in the cable, such a rotational speed will be imparted to the sheave that the centrifugal pawls 19 are swung out into engagement with the ratchet rim 23, which is screwed against the elastic washers 25 at a sliding movement on the latter. Here, the braking effect described hereinbefore sets in. The worker's movement of fall is thus braked softly and is brought to a standstill relatively soon, that is, when the ratchet rim has pressed the outer portion of the elastic washers into engagement with the inside of the cover 6, or, when an indicator pin 29 is provided, when the latter has been pressed out as far as will be permitted by the spring 32.

What I claim is:

1. A safety block comprising a housing provided with a screw-threaded interior annular portion, a sheave rotatably mounted in said housing and adapted to receive a cable, a cable having one end thereof secured to the sheave, an operating spring connected with said sheave to urge the sheave to a wound position of the cable, a friction brake, a centrifugal clutch adapted to couple said sheave to the friction brake at a predetermined rotational speed of said clutch, said friction brake comprising interengaging friction members, one thereof forming a distortable friction spring, and another of said friction members being screw-threaded and rotatably engaging said screw-threaded annular portion to stress said friction spring to successively augment the spring force as the braking operation proceeds.

2. Safety block comprising a housing, a sheave rotatably mounted in said housing and adapted to receive a cable, a cable having one end thereof secured to the sheave, an operating spring connected with said sheave to urge the sheave to a wound position of the cable, a ratchet rim having screw-threaded engagement with the housing and being formed with a frictional brake surface, a centrifugal pawl mounted on said sheave to couple the sheave to said ratchet rim on exceeding a predetermined rotational speed of the sheave, and spring washers mounted non-rotatably in said housing for engagement and deflection by the frictional brake surface of said ratchet rim as the ratchet rim is screwed in the housing by the actuation from said pawls.

3. Safety block as claimed in claim 1 and further characterized by an indicator for cooperation with the friction brake to indicate at a position externally of the housing whether the safety block is released.

4. Safety block as claimed in claim 2 and further comprising a pin displaceable in an aperture in said housing, an inner end of said pin being engaged by the friction brake and the other end being visible in said aperture.

5. Safety block as claimed in claim 1 and further comprising a catch to lock the sheave to the housing of the block for preventing withdrawal of said cable, if required.

References Cited in the file of this patent

UNITED STATES PATENTS

| 1,308,480 | Caouette | July 1, 1919 |
| 1,777,784 | Cole | Oct. 7, 1930 |
| 2,466,688 | Culver | Apr. 12, 1949 |

FOREIGN PATENTS

| 521,950 | Belgium | Aug. 31, 1953 |